United States Patent [19]
Dillon

[11] Patent Number: 5,928,718
[45] Date of Patent: Jul. 27, 1999

[54] PROTECTIVE COATING FOR REFLECTIVE SUNGLASSES

[76] Inventor: Stephen M. Dillon, 8009 E. Dillon's Way, Scottsdale, Ariz. 85260

[21] Appl. No.: 08/937,758

[22] Filed: Sep. 25, 1997

[51] Int. Cl.$^6$ ........................................... B05D 5/06
[52] U.S. Cl. .................... 427/164; 428/412; 427/404; 427/407.1; 350/44
[58] Field of Search ............... 428/412; 427/164, 427/404, 407.1; 350/44

[56] References Cited

U.S. PATENT DOCUMENTS

| | | | |
|---|---|---|---|
| 3,933,407 | 1/1976 | Tu et al. | 427/162 |
| 4,211,823 | 7/1980 | Suzuki et al. | 428/412 |
| 4,291,097 | 9/1981 | Kamada et al. | 428/412 |
| 4,315,970 | 2/1982 | McGee | 427/164 |
| 4,355,135 | 10/1982 | January | 524/767 |
| 4,435,476 | 3/1984 | Phillips et al. | 428/412 |
| 4,490,495 | 12/1984 | WEber | 524/264 |
| 4,492,733 | 1/1985 | Phillips et al. | 428/412 |
| 4,547,397 | 10/1985 | Burzynski et al. | 427/164 |
| 4,551,361 | 11/1985 | Burzynski et al. | 427/164 |
| 4,715,702 | 12/1987 | Dillon | 381/44 |
| 4,934,792 | 6/1990 | Tovi | 350/320 |
| 5,073,009 | 12/1991 | Tovi | 359/601 |
| 5,099,360 | 3/1992 | Tovi | 359/601 |
| 5,367,019 | 11/1994 | Sawaragi | 524/780 |
| 5,459,176 | 10/1995 | Bae et al. | 522/181 |
| 5,560,751 | 10/1996 | Hosyiyama | 427/164 |

Primary Examiner—Janyce Bell
Attorney, Agent, or Firm—Warren F. B. Lindsley

[57] ABSTRACT

An improved lens structure for reflective sunglasses incorporating a conventional resin/polymer type coating for protection of the mirror finish against abrasion and smudging and providing a means for causing the resin/polymer coating to adhere reliably to the mirror surface.

9 Claims, 1 Drawing Sheet

PROTECTIVE COATING FOR REFLECTIVE SUNGLASSES

BACKGROUND OF THE INVENTION

Mirror coated sunglass lenses are widely used in the sunglass industry. Mirror coatings are useful for filtering light as well as creating a fashionable appearance. Conventional mirror coated lenses are created by applying, to the convex side of a conventional tinted lens, a very thin reflective material. The technique of applying the mirror is called vacuum deposition. Thickness of the reflective film is in the order of microns. Depending on the thickness and type of the reflective material, the reflective film will reflect a portion of the total amount of light striking the surface of the reflective film and allow the remaining portion of light to pass through. The drawback to lenses that have reflective coatings is that the reflective coatings are very susceptible to abrasion, scratching and visible smudging, depending on the type of reflective coating some are more susceptible than others. Mirror coated lenses that have smudges on them tend to be somewhat difficult to clean and are easily scratched and/or abraded when trying to remove smudges from the surface of said reflective film. Again, depending on the type of reflective coating, some are more susceptible than others.

There are basically two types of scratch resistant coatings that are applied to eyeglass lenses. The first type is applied by vacuum deposition and typically consists of metal or silicon type material. Most all vacuum deposited mirror coated lenses are provided, during the coating process, an outer coating (of the type mentioned) which provides limited scratch protection. Without it, the reflective medium would be overly susceptible to abrasion. The other is a polymer/resin type coating that is applied to the surface of an uncoated eyeglass lens (in liquid form) and then cured to a very hard solid state by exposure to ultra-violet (UV) light and/or heat. The cured polymer coating then provides a very durable scratch resistant outer surface. Of the two basic types of protective coatings, the polymer/resin type coating is considerably more durable.

There are numerous types of polymer type scratch resistant coating products available for "uncoated" plastic eyeglass lenses and there are many patents covering the numerous types. Polymer coatings, however, are designed to be applied directly to the surface of a plastic lens, not to the reflective surface of a mirrored lens. When applied to the surface of a mirror coating in the manner in which they are applied to uncoated lenses, the polymer coatings do not adhere.

Typically, all polycarbonate lenses have polymer type scratch resistant coatings. Both front and back coatings can be applied in different ways such as dip coating or spin coating. If a mirror coating is desired, the mirror coating is placed over the scratch resistant coating. The very thin reflective medium is then the outermost layer. Allyl diglycol carbonate (CR-39) is another type of plastic commonly used in the optical industry. Though much more scratch resistant than polycarbonate, manufacturers often apply polymer type scratch resistant coatings to CR-39 lenses as well. Again, if a mirror coating is desired, the mirror coating is placed over the scratch resistant coating. The very thin reflective medium is then the outermost layer.

The present invention discloses not only the idea of applying a polymer type protective coating over the surface of a mirrored sunglass lens but a means of accomplishing said objective using conventional polymer type scratch resistant coatings. Applying a polymer type scratch resistant coating to the reflective surface of a mirrored lens will provide the same level of protection to the reflective surface as is presently provided by such polymer coatings for non-mirrored lenses. Additional protection afforded by the polymer coating includes reduced sensitivity to liquids such as sweat, oil from skin etc. which tend to smudge and discolor the appearance of an unprotected mirror surface. Along with such enhanced protection, the invention provides the option of adding color to the protective coating for the purpose of additional filtering of light and for the enhancement of the aesthetic appearance of the mirror.

These benefits are achieved by means of a relatively thin layer of protective coating that does not produce any noticeable degree of double reflection.

DESCRIPTION OF THE PRIOR ART

Examples of materials and eyeglass constructions relating to the present invention are described in a number of U.S. Patents, including the following:

Several patents describe scratch resistant coatings for non-reflective plastic lenses. This group of patents include U.S. Pat. Nos. 4,211,823 (Suzuki et al.), 4,291,097 (Kamoda et al.), 4,355,135 (January), 4,435,476 (Phillips and Haddad), 4,490,495 (Weber), 4,492,733 (Phillips and Haddad), 4,547,397 (Burzyaski and Tillman), 4,551,361 (Burzynski and Tillman), 5,367,019 (Sawaragi), and 5,459,176 (Bae and Ottoboni).

Murray Tovi discloses laminated beam splitting optical structures and light transmitting structures incorporating a reflective medium and irregular surfaces as described in his U.S. Pat. Nos. 4,934,792, 5,099,360 and 5,073,009. These structures sandwich a vacuum deposited mirror coating between sculptured layers of plastic or glass. The purpose of the lens construction is to create a three dimensional image on the lens which is apparent to a viewer but not apparent to the person wearing the sunglasses. The manner in which this lens is constructed creates a transparent layer over the surface of the mirror which is of a thickness great enough that if the light reflecting medium were optically smooth and not contoured (note: that Tovi describes a contoured reflective medium not an optically smooth reflective medium), the resulting double reflection would be very apparent and aesthetically undesirable. Furthermore, the different methods used to create the final lens construction, as outlined by Tovi, are not only vastly different from the methods disclosed in this invention but are far more labor intensive. In conclusion, the method of construction as well as the function and appearance of the final lens construction disclosed by Tovi differ greatly from that of the lens construction disclosed in this patent application.

Stephen M. Dillon, inventor of the present disclosure, describes in his U.S. Pat. No. 4,715,702 an optical structure for providing a decorative pattern over the surface of a sunglass lens that is visible to an observer but not to the wearer of the sunglasses. This multi-layer sunglass construction sandwiches a vacuum deposited mirror coating between two layers of optically clear plastic sheets. The two plastic sheets have images and or designs printed on them. The purpose of this lens construction is to create a two dimensional image on the lens which is apparent to a viewer but not apparent to the person wearing the sunglasses. The manner in which this lens is constructed requires a solid state transparent substrate to be placed over the surface of a reflective film. The solid state substrate is of a thickness great enough that the resulting double reflection is apparent. As previously stated, this is aesthetically undesirable.

Another disadvantage regarding the application of a solid state substrate over the surface of a mirror coated lens is that it is far more labor intensive than applying a thin liquid state coating to a lens and then curing it. Bringing together two solid state substrates (this is in general reference to the first mirror coated transparent solid state substrate and the second transparent solid state substrate which is to be bonded to the first mirror coated substrate) requires a laminating process. A laminating process requires a type of glue or adhesive to hold the two substrates together. The laminating process is labor intensive enough when working with flat substrates but is further complicated when working with spherical surfaces. Most conventional eyeglass lenses are spherical. In conclusion, the objective of the lens construction as well as the different methods used to create the final lens construction, as outlined in U.S. Pat. No. 4,715,702 are vastly different from the methods disclosed in this invention and are far more labor intensive.

None of the U.S. patents referenced above discloses means intended expressly for the purpose of protecting reflective mirror surfaces against scratching or abrasion or addresses the problems associated therewith. As pointed out, there remains a need for such a protective coating that will adhere reliably over time to a reflective surface.

SUMMARY OF THE INVENTION

In accordance with the invention claimed, an improved lens construction is provided for eyeglasses with reflective lenses wherein the reflective surfaces of the lenses are adequately protected over a reasonably long period of time against scratching and abrasion. More particularly, the invention discloses the application of a conventional resin/polymer type protective coating over the surface of a mirrored sunglass lens and a means for causing the conventional polymer type scratch resistant coating to adhere effectively to the surface of the mirror coated lens.

It is, therefore, an object of the present invention to provide an improved reflective sunglass structure incorporating improved means for the protection of reflective lenses against scratching and abrasion.

Another object of this invention is to provide improved protection for reflective lenses against smudging, finger prints and other exposures to liquids, body oil and the like.

A further object of this invention is to provide such a protective means in the form of a coating that adheres reliably over time with the very smooth surface of a reflective lens.

A further object of this invention is to provide such a protective means in a form that can readily be applied in a very thin layer such that double reflections are minimized and rendered substantially unnoticeable.

A still further object of this invention is to provide such protective means in a form that is applicable for protection of reflective surfaces other than those of reflective eyeglasses.

A still further object of this invention is to provide such protective means in a form which may employ a tintable or a non-tintable scratch-resistant coating.

A still further object of this invention is to provide such protective means in a form that incorporates as an important component thereof a cured resin or polymer of the type that has been found effective and durable over time for the protection of non-reflective eyeglasses but which has heretofore not been employed to protect the mirrored surface of reflective lenses.

Yet another object of the present invention is to provide a means for adding color to the mirror surface of the lens through the use of tintable protection coatings for the reflective surface.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings in which.

Thickness dimensions shown in FIGS. 2 through 5 are exaggerated for purposes of illustration.

DESCRIPTION OF THE EMBODIMENT

Figure 1:
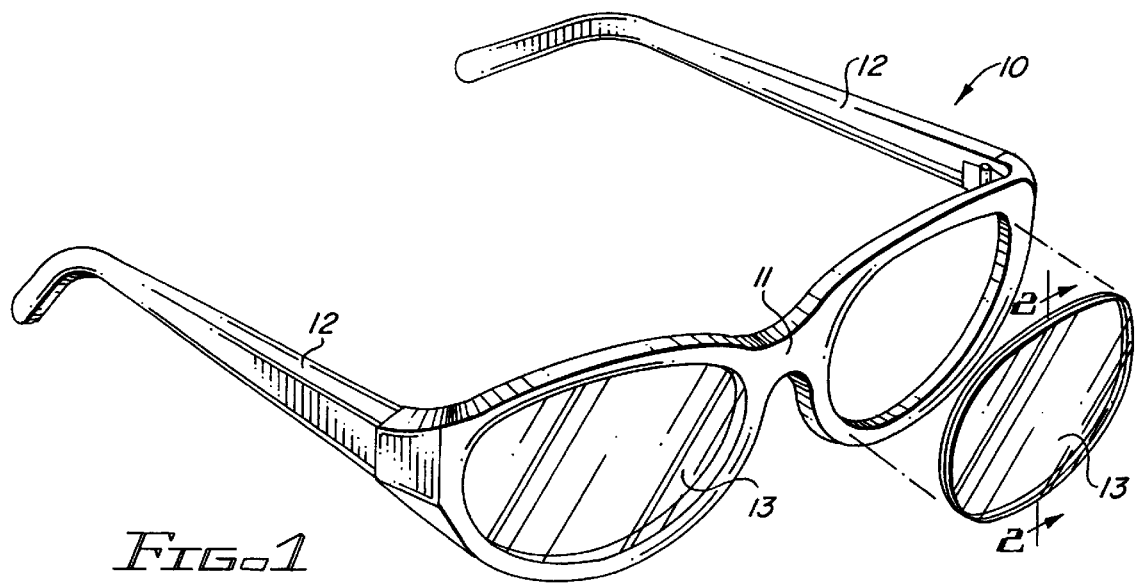
FIG. 1 is a perspective view of a pair of sunglasses with one lens being shown removed from the frame for purposes of illustration.

Referring more particularly to the drawings by characters of reference, FIG. 1 discloses a pair of sunglasses 10 embodying the invention and comprising a frame 11, temples 12 and reflective lenses 13. As shown in the cross-section of FIG. 2, the lens 13 has a support structure 14, a reflective film 15 and a polymer/resin type protective coating 16.

Support structure 14 is the basic eyeglass lens. It may or may not be ground for correction of vision and it may or may not be tinted for color. Structure 14 may be made of glass or any one of a number of different optical grade plastic materials that have been found appropriate for eyeglass lens construction such as allyl diglycol carbonate, polycarbonate or acrylic.

Figure 2:
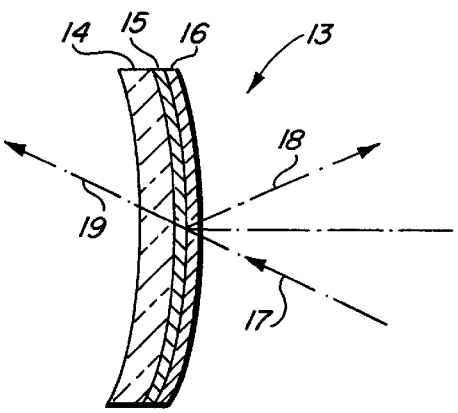
FIG. 2 is a cross-sectional view of an eyeglass lens structure incorporating a mirrored surface with a resin/polymer type protective coating applied thereto, the cross-sectional view being taken along line 2—2 of FIG. 1.

The reflective film 15 may comprise any type of optical grade light-transmitting thin film. The film is typically applied by vacuum deposition and the thickness of the film is in the order of microns. Depending upon the thickness of the film and the nature of the reflective material, the film will reflect some portion of the total amount of light striking its reflective surface and will allow the remaining light to pass through the film. As shown in FIG. 2, an impinging light beam 17 separates into a reflected beam 18 and a transmitted or penetrating beam 19.

The present invention teaches combinations of materials and processes for applying a very thin yet effective and durable polymer/resin type protective coating 16 that adheres well over long periods of time to the reflective film 15.

Figure 3:
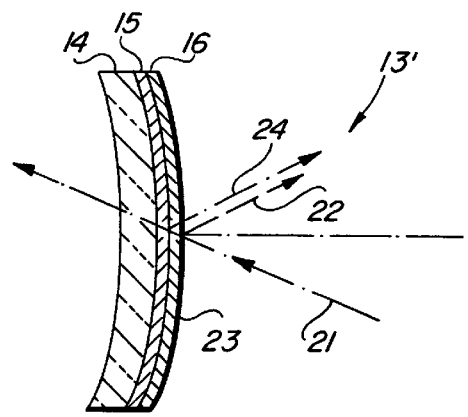
FIG. 3 is a second cross-sectional view taken along line 2—2 of FIG. 1 as an illustration of double reflection which can produce noticeably undesirable effects if the resin/polymer protective coating is relatively thick.

FIG. 3 illustrates the importance of providing the protective coating 16 in a very thin layer as a means for minimizing the undesirable effects of double reflection. As shown in FIG. 3, a light beam 21 directed into lens 13' produces a first reflected beam 22 as it strikes the external surface 23 of coating 16. A second reflected beam 24 is produced as beam 21 strikes the surface of the reflective film 15. An image produced by such double reflection as seen by an observer will be blurred, with two images displaced from each other. The thicker the coating 16, the greater the displacement and the more apparent the blurred double reflection effect will be. It is important, therefore, that whatever form of protection is employed, a very thin protective layer is much to be desired if not imperative for the sake of minimizing such double reflection effects.

Figure 4:
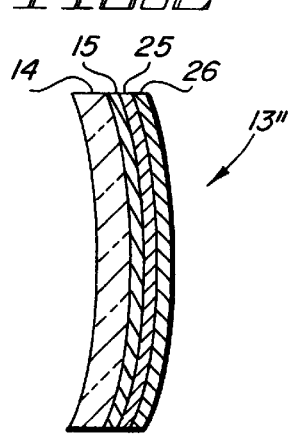
FIG. 4 is a third cross-sectional view taken along line 2—2 of FIG. 1 wherein the lens has been coated with an adhesion promoter and a protective layer of a resin or polymer in a first embodiment of the present invention.

A means by which the resin/polymer type scratch resistant coating is made to adhere to the surface of a mirrored lens is illustrated in FIG. 4. The first embodiment of the invention is shown as a lens structure 13" wherein the reflective coating 15 is first applied to the support structure 14 as already described. The reflective surface is then coated with an adhesion promoter 25. The adhesion promoter is applied as a liquid and is allowed to dry, after which the protective coating 26 is added. Protective coating 26 is applied in a liquid state. Protective coating 26 is allowed to flow freely over the entire surface of the prepared lens structure and then subsequently cured to a solid state. The technique of allowing the adhesion promoter and resin/polymer type protective coating to flow out thin across the lens is what minimizes the effect of double reflection to a negligible amount.

The adhesion promoter 25 adheres well to the reflective film and the protective coating 26 adheres well to the adhesion promoter. Thus, a level of scratch resistance and abrasion protection is achieved for the reflective film approximating that obtainable for the surface of a plastic lens.

In a first implementation of the embodiment of FIG. 4, the adhesion promoter 25 was a silane of the type intended to cause adhesion between the resin/polymer type protective coating and the mirrored surface. Two silane products were found to be satisfactory for that purpose. One is offered by Huls America Inc. under the trade name Dynasylan Glymo; the other is available from Dow Corning Corp. as product name Z6032.

Prior to the application of the adhesion promoter to the reflective surface, the reflective surface should be thoroughly cleaned using soap and water. Depending upon the concentration of the silane that is employed, it may need to be thinned prior to application. In early implementations of the invention, the silane solution was diluted with methyl alcohol in a ratio of 1.0 to 1.5 parts silane to 100 parts methyl alcohol. Other ratios may also be found satisfactory. The methyl alcohol serves as a carrier that disperses the silane in a very thin layer, microns thick, over the reflective surface.

In the first implementation of the invention, the adhesion promoter was applied by spin coating, a method that is well known in the industry. Spin coating is the same method of application as that is commonly used to apply scratch resistant coatings to conventional non-reflective lenses. Another suitable method is by dip coating wherein the lens is dipped into the adhesion promoter solution. The adhesion promoting solution is then wiped off the back side of the lens and the adhesion promoter remaining on the reflective surface is allowed to dry. Both methods were found to be satisfactory. After the adhesion promoter solution has dried, the surface is ready for application of the scratch resistant coating 26.

In early implementations of the invention, both tintable and non-tintable protective coatings were found satisfactory. A suitable tintable coating is available from Lens Technology under the product name HT-550. A suitable non-tintable coating is also available from Lens Technology Inc. under the product name SHC125B. In both cases, these products are applied, preferably by spin coating, as liquid resins. They are then cured by ultraviolet light. In some cases, the first layer of protective coating may produce discoloring of the reflective lens. This can be corrected by applying one or more additional layers. Prior to the addition of each layer, the preceding layer should be cured and lightly etched. Even with such multiple layers of protective coating, the total coating thickness is much too thin to produce a noticeable degree of double reflection.

The tinting process for the tintable protective coating employs special use dyes that are made specifically for tinting plastic lenses and tintable scratch resistant coatings. A source for the special dyes is a company known as BPI. The process, which is a standard method well known in the optical industry, involves soaking the entire lens in a heated tint bath. Depending on what type of material the stock lens is made of it may absorb the tint on the concave side of the lens as well as the tintable scratch resistant coating coated convex side of the lens. For example, if the tint, intended to be absorbed by the tintable scratch resistant coating is red and the stock lens is of a type that inherently absorbs tint, the red tint will be absorbed by both the convex and concave side. CR-39 is a lens material that will inherently absorb tint, on the other hand, polycarbonate and glass do not inherently absorb tint. If CR-39 is being used, applying a non-tintable scratch resistant coating on the concave side of the lens will keep the concave side of the lens from absorbing tint. If this is done, for the purpose of efficiency, the non-tintable scratch resistant coating should be applied to the stock lens prior to receiving the mirror coating.

The tintable coatings may be employed when it is desired to add color to the mirror finish. This may be done for the purpose of providing additional filtering of light as well as to add to the aesthetic appearance of the mirror.

Colored mirrors are readily available in the marketplace but the conventional means by which they are colored is quite different from the means disclosed in this invention.

Conventional colored mirror lenses are created by a vacuum deposition process. The resulting reflected color of the mirrored lens is determined by a number of things such as the material used to coat the lens as well as the number of layers and the thicknesses of the given types of materials. The materials used to create conventional vacuum deposited colored mirror lenses range from silicones to different types of metals.

In the practice of the present invention, when it is desired to add color to the mirror surface, a tintable polymer/resin type protective coating is applied in the manner already described for the non-tintable coatings. After the tintable protective coating has been cured, the protective coating is tinted to the desired color. It is to be noted that the process of adding color to the tintable coating is the same as that employed for adding color to the same type of tintable coating when it has been conventionally applied to a non-reflective eyeglass lens. In the case of the non-mirrored lens, however, the intent is to alter the color content of the light reaching the eyes of the wearer for sunlight protection whereas in the case of the reflective lens construction of the present invention the primary intent is to alter the color of the mirror surface as viewed by an observer.

At the same time, it should be recognized that in the case of the present invention, the base tint of the lens, which provides meaningful sunlight protection, is separated from the colored scratch resistant coating by the vacuum deposited mirror coating. For this reason, the two colors do not mix in terms of the mirror coloring as viewed by the observer. Thus, if the base tint of the support structure is dark gray (the color of the mirror is bright silver) and the tint of the scratch resistant coating is red, an observer will see the lens as being red whereas the wearer of the lenses will see a mixture of red and dark gray. Of course, if basic lens structure 14 is clear and uncolored and the reflected color of the mirror is silver, the resulting reflected color of the mirror and the color of the light reaching the eyes of the wearer will both match that of the tint that is added to the protective coating.

An advantage of being able to add color to the surface of a mirror coating, after the mirror has been applied, is that it allows for flexibility in choosing the final color of the mirror. If there are two pairs of lenses, for example, one pair can be tinted red the other pair can be tinted blue.

Figure 5:
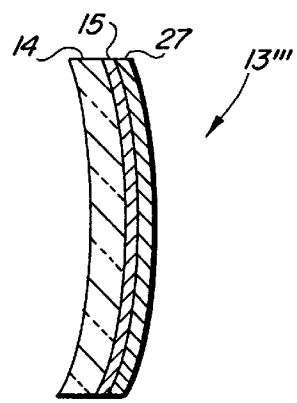
FIG. 5 is a fourth cross-sectional view taken along line 2—2 of FIG. 1 wherein the lens has been coated with a protective layer of a modified resin/polymer in a second implementation of the present invention.

Lens structure 13''' shown in FIG. 5 represents a second embodiment of the invention wherein the adhesion promoter 25 and the protective coating 26 of lens 13'' (FIG. 4) are replaced by a single protective layer 27. Layer 27 of lens 13''' comprises a mixture of adhesion promoter and resin/polymer type protective coating materials employed for lens 13'', the purpose being, to cause said resin/polymer type protective coating to adhere directly to the mirrored surface of the mirrored lens. While trials of this embodiment have not as yet produced results matching those of the first embodiment, some degree of success has been realized and it is expected that an optimum protective coating material comprising a mixture of adhesion promoter and polymer/resin type coating material will be found. Tintable or non-tintable protective coatings may also be employed in this embodiment.

Step-by-step procedures for implementing the various versions of the protective coating disclosed in this invention are summarized below.

Application of Non-Tintable Resin/Polymer Type Scratch Resistant Coating to Mirrored Surface of Mirrored Lens Method 1—Wherein adhesion promoter (as a pre-treatment) is applied as a primer to the lens.

1. Use a mirror coated lens;
2. Insure that the mirrored surface of the lens is clean and dry. Cleaning the reflective surface of the mirror coated lens may be done with soap and water.
3. Prepare the Adhesion Promoter—Adhesion promoters of the type described in this document, come in liquid form. Usually silanes (adhesion promoter) come in concentrated form and, depending on how the silane is to be used, may have to be diluted. Tests were conducted using a concentrated form of silane which had to be diluted before it could be used to effectively coat the lens. In tests undertaken, the silane was diluted in methyl alcohol at a ratio of 1 to 1.5 parts silane to 100 parts methyl alcohol. Other ratios may also prove successful. The function of the methyl alcohol is that of a carrier. Once the carrier/silane solution is applied as a thin coating to the lens, the carrier solvents are allowed to evaporate away leaving a transparent dry thin film coating of silane on the surface of the mirror. It is this film that the conventional resin/polymer type protective coating will adhere to.
4. Apply Adhesion Promoter—Two different methods of applying the adhesion promoter to a lens can be used, namely spin coating or dip coating. Spin coating is a method well known in the industry and is used to apply adhesion promoter to the lens in the same manner as the spin coating method is widely used to apply resin/polymer type scratch resistant coatings to conventional uncoated eyeglass lenses. In the dip coating method, the mirror coated lens is dipped into the adhesion promoting solution. The adhesion promoter solution is then wiped off of the backside of the lens. The remaining adhesion promoter on the surface of the mirror coated lens is then allowed to dry. Note: the manner in which the adhesion promoter is applied to the lens is not unique—the fact that it is used as a surface treatment for the purpose of allowing a scratch resistant coating to adhere to the surface of the mirror coating is unique.
5. Apply the resin/polymer type protective coating to the surface of the adhesion promoting film. This scratch resistant coating can be applied by dip coating or spin coating. After resin/polymer type protective coating is applied it is cured by ultra violet light. On all tests conducted, the scratch resistant coatings were applied by spin coating technique.

Application of the resin/polymer type scratch resistant coating will alter the appearance of the mirror to a degree, how much it is altered depends mainly on the final thickness of the resin/polymer type scratch resistant coating. For example, if the mirror is a silver chrome, the resin/polymer scratch resistant coating can change the appearance of the mirror from a silver to a rainbow. If the color change is undesirable, increasing the thickness of the resin/polymer type scratch resistant coating will allow the mirror, to a large degree, maintain its original color and appearance. The effect of color changes due to thin films of differing refractive indices is well known and is not the object of this invention. The thickness of the resin/polymer type scratch resistant coating can be increased by slowing down the rpm of the spinning means if spin coating is used to apply the resin/polymer type scratch resistant coating. Note: if the rpm is too low, streaks can appear in the resin/polymer type scratch resistant coating as well as pooling of the resin/polymer type scratch resistant coating around the edges of the lens. Therefore the amount the rpm can be reduced is limited. Another option is to apply multiple resin/polymer type scratch resistant coatings on the surface of the mirror, that is to say, apply and cure one resin/polymer type scratch resistant coating, then apply and cure a second resin/polymer type scratch resistant coating until the mirror is restored to its original color. A second resin/polymer type scratch resistant coating can be effectively applied to the surface of an already applied and cured resin/polymer type scratch resistant coating without having to apply another coating of adhesion promoter. For best results, before applying a second resin/polymer type scratch resistant coating over a first resin/polymer type scratch resistant coating, the surface of the first resin/polymer type scratch resistant coating should be treated by etching its surface. The surface can be effectively etched by scrubbing the surface with a mild abrasive. If this is not done, the second resin/polymer type scratch resistant coating may not flow evenly across the surface of said first resin/polymer type scratch resistant coating.

Method 2—Adhesion promoter added to the resin/polymer type scratch resistant coating prior to application of the scratch resistant coating to surface of a mirror.

1. Use a mirror coated lens;
2. Insure that the mirrored surface of the lens is clean and dry. Cleaning the reflective surface of the mirror coated lens may be done with soap and water.

3. Add adhesion promoter (as an additive) to the non-tintable scratch resistant coating solution. The adhesion promoter, in liquid form, is added to the scratch resistant coating fluid prior to the scratch resistant coating being applied to the lens and cured. The adhesion promoter is added to the scratch resistant coating in a ratio of approximately 1 to 5 parts silane to 100 parts scratch resistant coating fluid. This has been done with limited success using Glymo (Huls America Inc.) and A6032 (Dow Corning) silanes and HT-125/HT-550 scratch resistant coating fluids (Lens Technology Inc.)

4. Apply the adhesion promoter treated scratch resistant coating. After resin/polymer type scratch resistant coating is applied, it is cured by UV light. On all tests conducted, the adhesion promoter treated scratch resistant coatings were applied by spin coating techniques.

The same principals of color change of mirror due to thickness of the resin/polymer type scratch resistant coating and means of offsetting the color change still apply to Method 2.

Application of Tintable Scratch Resistant Coating to Mirrored Surface of Mirrored Lens To begin with the method of applying a tintable scratch resistant coating is not any different than applying a non-tintable scratch resistant coating (previously described).

Method 1—Adhesion promoter is applied as a primer

1. Use a mirror coated lens. If intending to add color to the mirror coated lens by tinting the convex side of the lens, it is best to use a vacuum deposited mirror coated lens that reflects the color of silver.
2. Insure that the mirrored surface of the lens is clean and dry. Cleaning the reflective surface of the mirror coated lens may be accomplished with soap and water.
3. Prepare and apply adhesion promoter the same as described previously under "Adhesion Promoter is Applied as a Primer (Pre-Treatment)".
4. Apply the tintable resin/polymer type scratch resistant coating. The tintable scratch resistant coating is applied the same way as the non-tintable scratch resistant coating. After the tintable resin/polymer type scratch resistant coating is applied, it is cured by UV light. On all tests conducted the scratch resistant coatings were applied by spin coating technique.

Note: The same principals of color change of mirror due to thickness of the resin/polymer type scratch resistant coating and means of offsetting the color change still apply.

5. Add the color of choice to the tintable resin/polymer type scratch resistant coating by placing the entire lens in a heated tint bath—this is done using special use dies that are made specifically for tinting plastic lenses and tintable scratch resistant coatings. BPI is the name of one particular company that sells these dies.

Method 2—Adhesion promotor added to the tintable resin/polymer type scratch resistant coating prior to application of the tintable resin/polymer type scratch resistant coating.

1. Use a mirror coated lens.
2. Insure that the mirrored surface of the lens is clean and dry. Cleaning the reflective surface of the mirror coated lens may be done with soap and water.
3. Add the adhesion promoter to the tintable resin/polymer type scratch resistant coating solution using the same procedures as described above under "Adhesion promoter added to the resin/polymer type scratch resistant coating prior to application of the scratch resistant coating to surface of mirror".
4. Apply the adhesion promoter treated tintable scratch resistant coating as previously described. After the tintable resin/polymer type scratch resistant coating is applied it is cured by UV light.

Note: The same principals of color change of mirror due to thickness of the resin/polymer type scratch resistant coating and means of offsetting the color change still apply.

5. Add the color of choice to the tintable resin/polymer type scratch resistant coating by placing the entire lens in a heated tint bath. Steps 5 and 6 of "Method 1—Adhesion promoter is applied as a primer" are the same.

Adhesion tests were conducted using a method which is generally used in the optical industry namely after the protective coating is applied to the lens using the methods disclosed in this patent application. The protective coating is scored (using a razor blade) in a crosshatch pattern. Standard Scotch brand tape is secured to the surface of the protective coating in the crosshatched area. The tape is then ripped from the crosshatched surface. The objective is to see if the tape can pull the protective coating from the surface of the mirror coating. This procedure is repeated a minimum of three times. If the protective coating fails to adhere it will be apparent due to the scratch resistant coating missing from the surface of the lens as well as the coating sticking to the tape. Other tests required the lens construction to be exposed to grinding, edging, polishing and tinting—the following combination worked well; either HT-550 tintable or HT-125B non-tintable hardcoats applied, using methods disclosed in this patent application, to the surface of silver chromium vacuum deposited mirror coatings on allyl diglycol carbonate and polycarbonate.

Applications of the invention can be extended to pre-mirrored semi-finished lenses. Semi finished lenses are lenses that are extra thick, so that they can be ground down to a specific prescription, and oversized so that they can be edged (shaped) to fit into a specific frame. Lenses of this type normally are uncolored. If coloring, such as a dark sunglass tint is desired, the coloring is added to the lens after it has been ground to prescription and edged to fit a specific frame. If any additional coatings are desired, such as a mirrored coating, this is done after the lens is tinted. Using the methods disclosed in this invention, a pre-mirrored semi-finished lens can be created with a protective coating over the mirror coating. The protective coating provides greater protection to the mirror during the grinding, polishing, edging and tinting process. Due to the extremes of the processes, i. e. grinding, polishing, edging and tinting, some types of mirror coatings have trouble remaining adhered to the lens. Tests using chromium as the reflective medium vacuum deposited onto allyl diglycol carbonate have proven successful.

Improved protection of reflective sunglass lenses against scratching, abrasion and smudging is thus provided in accordance with the stated objects of the invention and although but a few embodiments of the invention have been illustrated and described, it will be apparent to those skilled in the art that various changes and modifications may be made therein without departing from the spirit of the invention or from the scope of the appended claims.

What is claimed is:

1. A lens structure for sunglasses comprising:
a support structure in the form of a eyeglass lens having a front surface,
a thin reflective mirror coating applied to the front surface of said eyeglass lens,
said reflective mirror coating being so thin and sparsely applied that only a fraction of the light impinging thereon is reflected and the remainder passes therethrough, and protective means against scratching, abrasion and smudging applied over said reflective mirror coating, said protective means comprising a polymer/resin type coating material that is applied in liquid form, said protective coating being allowed to flow over the entire surface of the mirror coating in a thin layer and then cured to a solid state by heat and/or ultra violet exposure.

2. A lens structure for sunglasses comprising:

a support structure in the form of a eyeglass lens having a front surface, a thin reflective mirror coating applied to the front surface of said eyeglass lens, said reflective mirror coating being so thin and sparsely applied that only a fraction of the light impinging thereon is reflected and the remainder thereof passes therethrough, protective means against scratching, abrasion and smudging applied over said reflective mirror coating, said protective means comprising a polymer/resin type coating material that is applied in liquid form and then cured to a solid state by heat and/or ultra violet exposure, said protective coating is allowed to flow freely in a thin layer over the entire surface of the mirror, and an adhesion promoting coating applied to the surface of the mirror to act as an interface between said protective coating and the surface of said reflective mirror coating for the purpose of causing said protective coating to adhere to the mirrored surface of a mirrored lens.

3. The lens structure set forth in claim 1 wherein:

prior to applying said polymer/resin type coating to said reflective mirror coating an adhesion promoting additive is added to and mixed with said polymer/resin type coating material.

4. The lens structure set forth in claim 3 wherein:

said adhesion promoting additive is a silane that enables said polymer/resin type coating to adhere to said reflective mirror coating.

5. The lens structure set forth in claim 2 wherein:

said adhesion promoting coating is a silane intended for use as a primer.

6. The lens structure set forth in claim 2 wherein:

said protective coating material is a non-tintable protective coating of the type available as a resin/polymer.

7. The lens structure set forth in claim 2 wherein:

said protective coating material is a tintable protective coating of the type available as a resin/polymer.

8. The lens structure set forth in claim 2 wherein:

said adhesion promoting coating is applied to the mirrored surface of said mirrored lens and is allowed to dry, leaving a thin film, prior to the application of said protective coating, and said protective coating and said adhesion coating are applied by a method which allows said coatings to flow freely and evenly across the surface of said mirror coated lens structure thereby obtaining a very thin layer of the adhesion promoting coating and protective coating.

9. A method of applying a protective coating to an eyeglass lens the steps comprising:

applying a thin reflective mirror coating to the front surface of an eyeglass lens, said coating being so thin and sparsely applied that only a fraction of the light impinging thereon is reflected and the remainder passes therethrough, applying an adhesion promoting coating over said reflective mirror coating to allow a polymer/resin type coating to adhere to said reflective mirror surface, applying a protective means against scratching, abrasion and smudging over said prepared reflective mirror coating, said protective means comprising a polymer/resin type coating material in liquid form, curing said protective coating material to a solid state by applying heat and/or ultra violet rays thereto.

* * * * *